United States Patent [19]

Kawasaki

[11] Patent Number: 5,091,937
[45] Date of Patent: Feb. 25, 1992

[54] CATV TERMINAL UNIT

[75] Inventor: Masahiko Kawasaki, Tokyo, Japan

[73] Assignee: Pioneer Electronic Corporation, Tokyo, Japan

[21] Appl. No.: 673,247

[22] Filed: Mar. 20, 1991

Related U.S. Application Data

[63] Continuation of Ser. No. 357,925, May 30, 1989, abandoned.

[30] Foreign Application Priority Data

Nov. 9, 1988 [JP] Japan .................... 63-281459

[51] Int. Cl.⁵ .............................. H04N 7/16
[52] U.S. Cl. ............................ 380/20; 380/7;
 380/10; 358/84; 358/86; 358/349; 455/2;
 455/6; 455/26.1
[58] Field of Search ............... 358/84, 86, 349; 455/2,
 455/6, 26.1

[56] References Cited

U.S. PATENT DOCUMENTS 4,439,785  3/1984  Leonard ........................ 380/20 X
4,789,863  12/1988 Bush ............................ 380/10 X
4,809,325  2/1989  Hayashi et al. ................. 380/20
4,829,569  5/1989  Seth-Smith et al. ............. 380/10

FOREIGN PATENT DOCUMENTS 61-129990  6/1986  Japan .

Primary Examiner—Bernarr E. Gregory
Attorney, Agent, or Firm—Sughrue, Mion, Zinn, Macpeak & Seas

[57] ABSTRACT

A CATV terminal in which an on-screen video message is superimposed over the selected video program to indicate if the selected program is a pay per view, i.e., chargeable, program. The in-band data from the head end carries an event code designating whether the program is chargeable or not. If chargeable, a controller in the CATV terminal activates an on-screen video generator to generate an on-screen message announcing that the program is a PPV or chargeable program. This is superimposed on the program, which is not observable by the viewer until an authorization key is activated. An event code altered by noise or the like will have little adverse effect since the in-band event code has a period equal to the vertical period and the controller continuously controls the on-screen video generator.

4 Claims, 3 Drawing Sheets

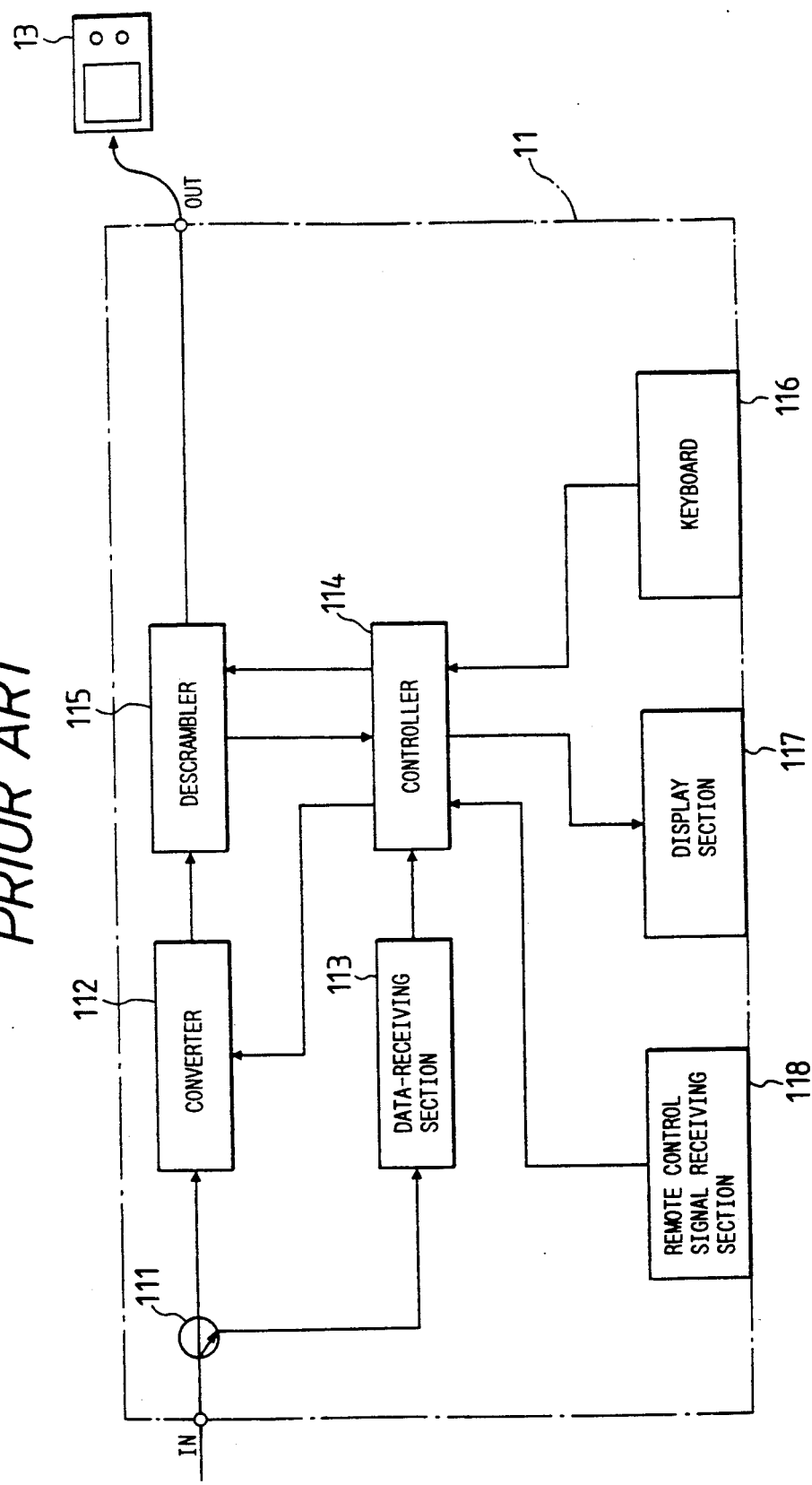

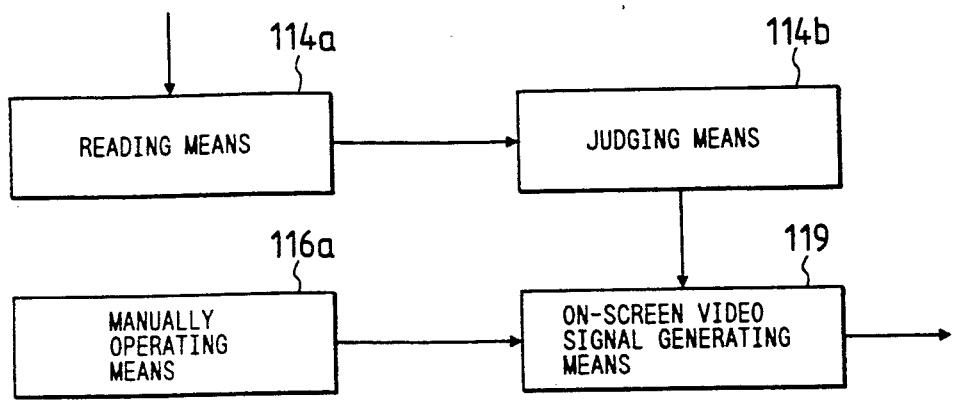
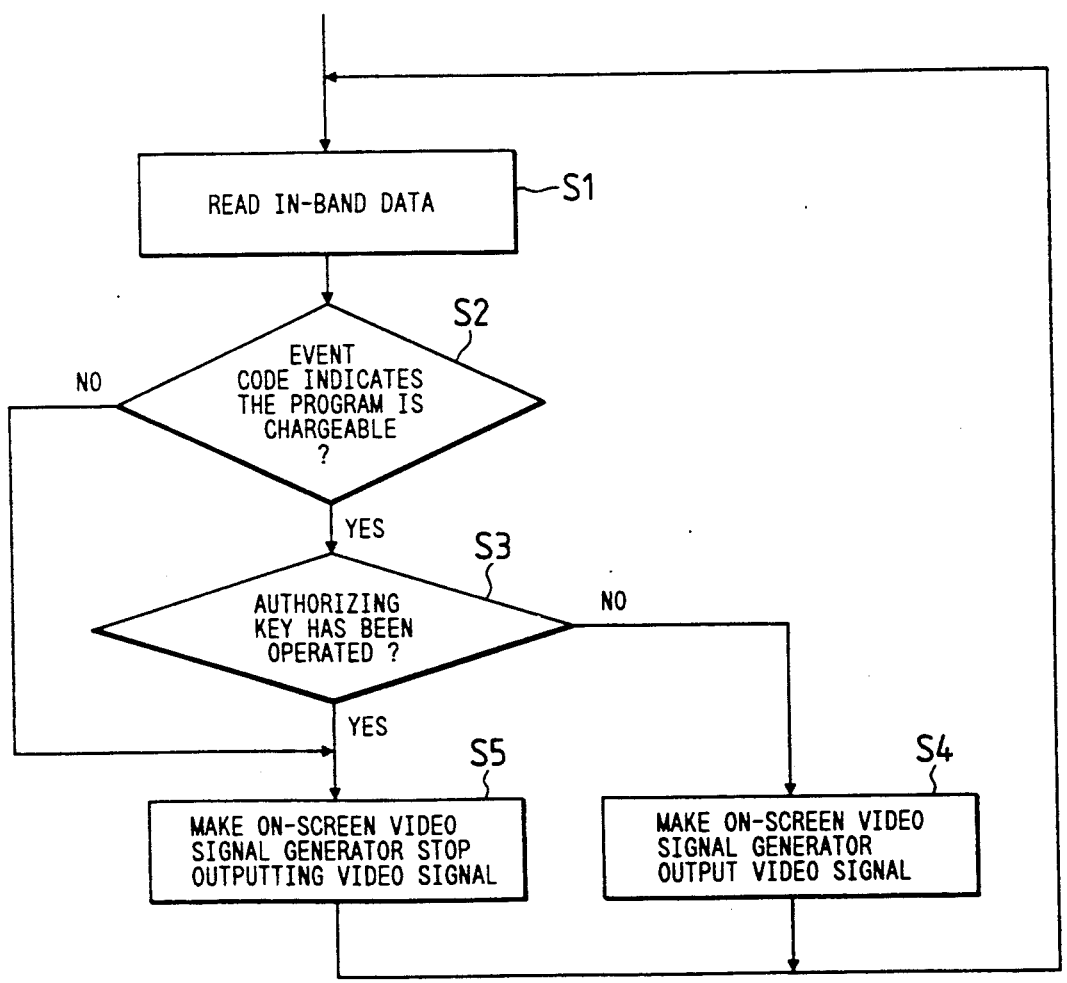

CATV TERMINAL UNIT

This is a continuation of application Ser. No. 07/357,925, filed on May 30, 1989, now abandoned.

BACKGROUND OF THE INVENTION

The present invention relates to a CATV terminal unit for selecting chargeable programs to be watched and for providing selected programs to a viewer.

In a conventional CATV terminal unit of this kind, there is provided an "Impulse pay per view (IPPV)" function in which a charge for the pay per view (PPV) program to be watched is paid just before the program is received. With an IPPV function when a channel is designated and selected by a ten-key pad for transmitting the pay per view program, the terminal unit selects a chargeable announcing channel without directly selecting the designated channel. In this state, when the TV viewer presses an authorizing key, the terminal unit selects the pay TV channel on which the program is transmitted and provides the viewer with the desired program. (The terms chargeable and pay per view are used interchangeably throughout.)

FIG. 1 is a block diagram of a conventional CATV terminal unit of the type described above. A terminal unit 11 is connected to the CATV head end via an input terminal IN and a transmission line such as a coaxial cable, etc. An RF signal composed of a video signal, etc., is transmitted from the head end through the transmission line. The transmission line is also utilized to perform a mutual communication of various kinds of data between the head end and CATV terminal unit 11.

The RF signal transmitted from the head end is distributed by a distributor 111 and is applied to a converter 112 and data-receiving section 113. The converter 112 selects a specific channel based on a selecting signal from a controller 114 composed of a CPU, and frequency-converts the signal of the selected channel to a frequency corresponding to a reserved channel, e.g., channel 3. The frequency-converted signal of the specific channel is inputted to a descrambler 115 and is descrambled by the descrambler 115, assuming descrambling is necessary, and passes through the descrambler 115 without descrambling when this signal has not been scrambled. The signal passed through the descrambler 115 is applied to a TV receiver 13 from an output terminal OUT.

The signal applied to the descrambler 115 through the converter 112 comprises in-band data including scramble data superimposed on an audio signal. The in-band data are extracted by the descrambler 115 and applied to the controller 114. The controller 114 controls the operation of the descrambler 115 so as to descramble the video signal based on the descramble data in the in-band data applied from the descrambler 115.

The data-receiving section 113 extracts various kinds of data transmitted by the specific channel in the RF signal distributed by the distributor 111 and applies the extracted data to the controller 114.

The controller 114 is connected to a keyboard 116 used for selecting the channel, etc., and the above selecting signal is generated by the key operation of the keyboard 116. The keyboard 116 has a key or keys for channel selection and a number of other keys such as a key for turning the power on and off, an authorizing key for confirming the pay per view program before actual viewing a key for adjusting the sound volume, etc. Signals generated by the operations of such keys are applied to the controller 114.

The controller 114 is further connected to a display section 117 and remote control signal-receiving section 118. In the display section 117, various kinds of operating states, messages, etc., are displayed under the control of the controller 114. A remote control optical signal emitted from an unillustrated remote control device is received by the remote control signal-receiving section 118, and is converted into an electric signal and applied to the controller 114. The remote control device can generate most or all the signals generated by the keyboard 116.

Whether or not a program of the channel selected by the viewer is a chargeable or pay per view program is determined by event code data included in the in-band data of the selected channel. However, the event code may be changed by a noise, etc., so as to indicate that the program is a pay program when it is a free program. If this occurs, the CATV terminal selects a chargeable announcing channel. Once such a state occurs, the system does not return to the original channel by pressing the authorizing key unless the viewer selects the channel again, which operation is cumbersome to the viewer.

Further, since this system requires one channel to be reserved for announcing that a selected program is a pay per view channel, the number of channels available for programming is reduced by one.

SUMMARY OF THE INVENTION

Accordingly, an object of the present invention is to provide a CATV terminal unit wherein the viewer can be notified of the selection of a pay per view channel without recourse to a pay per view announcing channel.

Another object of the invention is to provide a CATV terminal which can supply a desired program of a selected channel without any cumbersome operation, even if the in-band data is changed by noise, etc., to data representing that the selected program is a PPV program.

With the above object in mind, the present invention resides in a CATV terminal unit for receiving a PPV program in which information as to whether a program is chargeable or not is transmitted as in-band data. The terminal unit comprises in-band data reading means for reading the in-band data of a selected channel; judging means for judging whether or not the program of the selected channel is chargeable on the basis of the in-band data read by the in-band data reading means; on-screen video signal generating means for generating a video signal for announcing that the selected program is chargeable and superimposing the generated video signal on a video signal of the selected channel when it is judged by the judging means that the selected channel is a PPV channel; and manually operable means for confirming the chargeable program on the basis of a picture of the chargeable announcement by the video signal generated by the on-screen video signal generating means. The generation of the video signal by said on-screen video signal generating means is stopped when it is judged by said judging means that the selected channel is not chargeable, or when it is confirmed by the operation of said manually operable means that the selected channel is chargeable.

BRIEF DESCRIPTION OF THE DRAWINGS

The present invention will be more apparent from the following description of the preferred embodiments thereof in conjunction with the accompanying drawings in which:

FIG. 1 is a block diagram showing an example of a conventional CATV terminal unit;

FIG. 2 is a block diagram showing the basic construction of a CATV terminal unit in accordance with the present invention;

FIG. 4 is a flow chart of a process performed by the controller of FIG. 3.

DESCRIPTION OF THE PREFERRED EMBODIMENT

Figure 3:
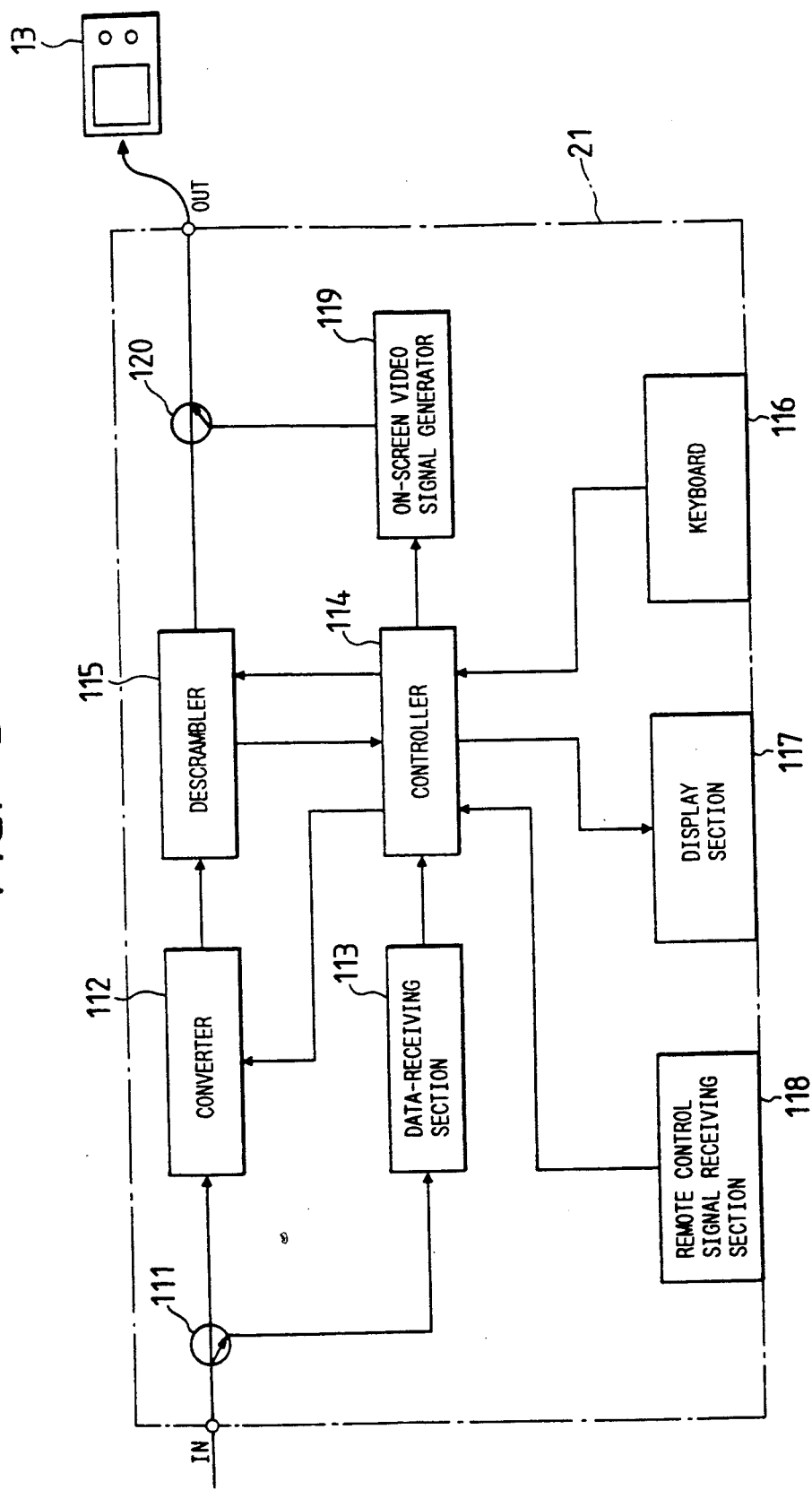
FIG. 3 is a block diagram showing one embodiment of the CATV terminal unit in accordance with the present invention.

FIG. 2 shows the basic construction of a CATV terminal unit in accordance with the present invention. A reading means 114a reads information as to whether a program is chargeable, based on information transmitted as in-band data. A judging means 114b judges whether or not the program of the selected channel is chargeable based on the read information. When the judging means 114b judges that the selected channel is chargeable, the judging means 114b causes an on-screen video signal generating means 119 to generate a video signal announcing that the selective program is a PPV program and superimposes the generated video signal on a video signal of the selected channel.

A TV receiver receives the video signal generated by the on-screen video signal generating means 119 and produces an image for announcing that the selected program is a PPV or chargeable program by superimposing this image on the image of the selected channel. When a viewer recognizes this announcing image and operates manually operable means 116a, the on-screen video signal generating means 119 stops the generation of the video signal. Thus, the image of the chargeable announcement superimposed on the picture of the TV receiver is erased and only the image of the selected channel is produced in the TV receiver.

When the judging means 114a judges that the selected channel is not chargeable, based on the in-band data of the selected channel, the generation of the video signal by the on-screen video signal generating means is stopped. Accordingly, even when the image of the chargeable announcement is produced by a noise, etc., the image is automatically returned to the image of the selected channel. Further, even when the selected channel is chargeable, a new non-chargeable program of this channel is automatically reproduced at a time point when the broadcast of the chargeable program has been completed with the selected channel being kept as it is.

FIG. 3 is a block diagram showing an embodiment of the CATV terminal unit in accordance with the present invention. In this figure, the same portions as those in the conventional CATV terminal unit 11 of FIG. 1 mentioned above are designated by the same reference numerals, and therefore the detailed explanation thereof will be omitted in the following description.

In FIG. 3, a controller 114 is further connected to a generator 119 for generating an on-screen video signal which is superimposed on a video signal of a chargeable program under the control of the controller 114. The above video signal to be superimposed may be constructed such that: characters for the chargeable announcement are superimposed on a picture-image which is gradated to a degree that the picture-image of the chargeable program cannot be identified characters for the chargeable announcement are superimposed on a color back image which is obtained by converting the picture-image of the chargeable program; characters for the chargeable announcement are superimposed on a portion of an image which is obtained by inverting the brightness of the picture-image of the chargeable program. The video signal generated by the on-screen video signal generator 119 is outputted through a coupler 120 from an output terminal OUT together with the signal from a descrambler 115 and is supplied to a TV receiver 13.

In the construction mentioned above when an RF signal is applied to an input terminal IN of a CATV terminal unit 21, only the signal of a specific channel selected by the operation of the keyboard 116 or a remote control device is frequency-converted by the converter 112. The signal of this specific channel is applied to the descrambler 115 to extract in-band data therefrom. The extracted in-band data is applied to the controller 114 to perform various kinds of processing with respect to the data.

As a result of the processing scramble data included in the in-band data is returned to the descrambler 115 so as to be used in a descrambling operation therein. The controller also determines whether or not the selected specific program is chargeable using the content of an event code included in the in-band data. When the selected specific program is chargeable, the controller 114 controls the on-screen video signal generator 119 to cause it to generate the on-screen video signal for the chargeable announcement which is to be superimposed on a picture-image of the chargeable program. The on-screen video signal is supplied to the TV receiver 13 from the output terminal OUT through the coupler 120 together with the descrambled video signal of the chargeable program from the descrambler 115, thereby producing, in TV receiver 13, the picture-image of the chargeable program and the picture-image for the chargeable announcement superimposed on the former picture-image.

When the event code included in the in-band data is changed by noise, etc., to a code representing a chargeable program, although it is really not a chargeable program, the on-screen video signal generator 119 is operated by this wrong code and the picture-image for the chargeable announcement is produced once on the screen of TV receiver 13. However, since the controller 114 continues to receive the in-band data from the descrambler 115 to monitor the event code, the operation of the on-screen video signal generator 119 is stopped and the picture-image for the chargeable announcement can be erased at a time point when the code changed by the noise, etc., is returned to a correct code. At this time, the picture-image of the specific channel selected by the keyboard 116 is produced on the screen of TV receiver 13.

The operation of CATV terminal unit 21 is generally performed as mentioned above. The detailed operation of this terminal unit will next be described with reference to the flow chart of FIG. 4 showing the main processing performed by a CPU constituting the controller 114.

In first step S1, the controller 114 reads the in-band data from the descrambler 115. Thereafter, the program proceeds to step S2 in which it is judged whether or not the channel selected at the present time is a chargeable program on the basis of the event code in the in-band data read in step S1. When the judgment in step S2 is YES, i.e., it is a chargeable program, the process proceeds to step S3 in which it is judged whether or not there is a signal input provided by the operation of an authorizing key of the keyboard 116 or of a remote control device.

When the judgment in step S3 is NO, i.e., there is no signal input by the operation of the authorizing key, the program proceeds to step S4 in which a signal is outputted for turning-on the on-screen video signal generator 119 to produce the on-screen video signal, thereafter returning to step S1. On the other hand, when the judgment in step S3 is YES, i.e., there is a signal input resulting from the operation of the authorizing key, the program proceeds to step S5 in which a signal is outputted for turning-off the on-screen video signal generator 119 to stop the generation of the on-screen video signal, thereafter returning to step S1.

When the judgment in step S2 is NO, i.e., the event code is not that of the chargeable program, the program proceeds to step S5 without proceeding to step S3. In step S5, a signal is outputted for turning-off the on-screen video signal generator 119 to stop the generation of the on-screen video signal, thereafter returning to step S1.

Since the event code in the in-band data read in step S1 is inserted each vertical synchronization period, the program of the flow chart shown in FIG. 4 is executed every vertical sync period.

When the event code is changed by noise, etc., in the execution of the above processing of the flow chart and it is judge to be the code of a chargeable program in step S2, although it is not really a chargeable program, the image for the chargeable announcement is produced on the screen of TV receiver 13 by the execution of the subsequent steps S3 and S4. However, the erroneous event code will not exist for a long time. A correct code is thereafter read by the controller 114 so that the judgement in step S2 becomes NO and it is judged that it is not a chargeable program, thereafter executing the processing in step S5. Accordingly, the image for the chargeable announcement is erased and only the image of the selected specific channel is produced on the screen of TV receiver 13.

When the authorizing key is not operated and is left as it is, the image for the chargeable announcement is automatically erased when the program on the selected specific channel ceases to be a chargeable program, so that the viewer can thereafter watch a free program without changing the channel.

As mentioned above, in accordance with the present invention, even when the in-band data included in the selected channel is data representing a chargeable program, the viewer can be informed that the selected program is a chargeable program without changing the channel to a chargeable announcing channel. Accordingly, it is not necessary to reserve a chargeable announcing channel, so that this channel can be used for another chargeable program by a company for cable television service.

Further, even when the in-band data is changed by noise, etc., to data representing a chargeable program, a desired program of the selected channel can be automatically recovered without performing any cumbersome operation at a time point when influence of the noise, etc., has disappeared, which is very efficient for the viewer.

Further, if a free program follows a chargeable or PPV program on a given channel, the viewer need not switch any channels to view the free channel if the CATV terminal is already set for the given channel, even though the PPV program was not viewable as a result of the on-screen video message.

What is claimed is:

1. A CATV terminal unit for receiving program signals in which information as to whether a program is chargeable or not is included as in-band data, said terminal unit comprising:
   in-band data reading means for reading the in-band data in a program of a selected channel;
   judging means for judging whether or not the program of the selected channel is chargeable on the basis of the in-band data read by the in-band data reading means;
   manually operable means for confirming the selection of a chargeable program;
   on-screen video signal generating means for generating a video signal for announcing a chargeable program and superimposing the generated video signal on a descrambled video signal of the selected channel in such a way that the generated video signal effectively blocks out the descrambled video signal of the selected channel when it is judged by the judging means that the program on the selected channel is chargeable and said manually operable means has not been operated; and
   on-screen video signal stopping means for stopping the generation of the video signal by said on-screen video signal generating means when it is judged by said judging means that the selected program is not chargeable, or when it is judged by said judging means that the selected program is chargeable and said manually operable means has been operated.

2. In a CATV terminal of the type having receiving means for receiving free and chargeable video program signals along with in-band data designating whether a program is free or chargeable, providing means for providing an announcemnt to a viewer when a chargeable program is selected, and canceling means for canceling said announcement either by the viewer confirming the selection and therefore the ammouncement is canceled at the beginning of the chargeable program, or by the chargeable program ending and therefor the announcement is canceled at the end of the chargeable program; the improvement comprising means responsive to said in-band data representing a chargeable program for generating a video message announcement announcing the existence of a chargeable program and superimposing means for superimposing said video message onto said chargeable program in such a way that the generated video message effectively blocks out the chargeable program, whereby the said message is viewable by the viewer superimposed over said chargeable program.

3. The CATV terminal of claim 2, wherein said means for generating and superimposing comprises an on-screen video signal generator, which generates an on-screen video signal, and a combiner means for combining said video program signals with said on-screen video signal.

4. The CATV terminal of claim 3, wherein said terminal is further of the type having a controller for controlling a frequency converter and a descrambler; said improvement further comprising said controller detecting the presence of said in-band data representing a chargeable status of a selected program and controlling said on-screen video signal generator in accordance with said detection.

* * * * *